March 19, 1968  T. W. KOSKINEN  3,374,048

DISPENSING AND STORAGE CONTAINER

Filed April 5, 1966

INVENTOR.
Toivo W. Koskinen
BY
Bernard, McGlynn & Reising
ATTORNEYS

United States Patent Office 3,374,048
Patented Mar. 19, 1968

3,374,048
DISPENSING AND STORAGE CONTAINER
Toivo W. Koskinen, 317 N. Main St.,
Romeo, Mich. 48065
Filed Apr. 5, 1966, Ser. No. 540,375
1 Claim. (Cl. 401—98)

ABSTRACT OF THE DISCLOSURE

A storage and dispensing container and, more specifically, a container including a housing of flexible organic polymeric material adapted to receive and slidably support a stick of material, and including a cap removably disposed about an open end of the housing with an end wall of the cap disposed in spaced relation to the open end of the housing so that the container may be inverted to allow the stick of material to slide out of the open end of the housing and abut the end wall of the cap to position a predetermined length of the stick out of the housing whereupon the walls of the housing may be grasped and flexed inwardly to frictionally engage the stick for engaging the stick with an article upon removal of the cap.

---

Various dispensers suitable for dispensing sticks of material such as butter, or the like, are well known in the prior art. However, such devices normally include a piston, plunger, or the like, movably disposed in a container for engaging the stick to move the stick out of the container. Such plungers are frequently connected to ratchets, levers or other mechanisms so that they may be moved within the container. Such prior art devices usually cannot be operated by one hand and frequently create health hazards. That is, such prior art devices are frequently difficult to clean and therefore present hygiene problems. Furthermore, such prior art devices are not adapted to receive foodstuff for dispensing thereof without the necessity of handling the foodstuff. In addition, such prior art devices include numerous components which are relatively expensive to manufacture and are frequently susceptible to breakage.

Accordingly, it is an object and feature of this invention to provide a storage and dispensing container which is simply constructed, easy to clean, and is capable of dispensing a stick of material, such as butter, in a manner that the material being dispensed need never be handled by human hands.

Another object and feature of this invention is to provide a storage and dispensing container which is simply manipulated to dispense material stored therein.

In general, these and other objects and features of this invention may be attained by a preferred embodiment including a housing made of flexible organic polymeric material and adapted for receiving and slidably supporting a stick of material to be dispensed. The housing has an open end with a flange disposed about the housing in spaced relation to the open end. A cap is removably disposed about the open end of the housing so as to engage the flange for positioning an end wall of the cap in spaced relation to the open end of the housing. A stick of material may be positioned in the housing and the housing may then be inverted so that the stick of material slides in the housing and out of the open end to engage or abut the end wall of the cap so that a predetermined length of the stick extends from the open end of the housing. The sides of the housing may be flexed inwardly to frictionally engage the stick to prevent sliding movement of the stick relative to the housing whereupon the cap may be removed to engage the exposed portion of the stick with an article to be coated with the material of the stick. Once the article is coated, the housing is positioned so that the stick of material slides back into the housing and the cap is replaced for storing material until it is to be used again.

Other objects and attendant advantages of the present invention will be readily appreciated as the same becomes better understood by reference to the following detailed description when considered in connection with the accompanying drawings wherein.

Figure 1:
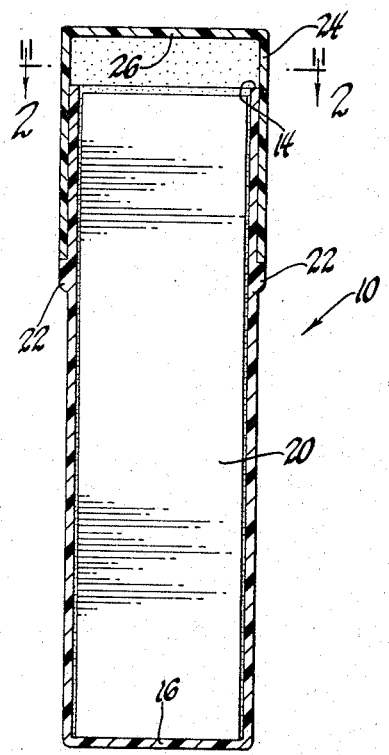
FIGURE 1 is a cross-sectional view of a preferred embodiment of the instant invention.

Referring now to the drawing, wherein like numerals indicate like or corresponding parts throughout the several views, a storage and dispensing container of the instant invention is generally shown at 10. The container is illustrated and described in conjunction with dispensing a stick of butter; however, it is to be understood that the container may be utilized to dispense various other materials.

The container includes a housing 12 which is substantially square in cross section and has an open end 14. More specifically, the housing includes four walls which are interconnected by a base wall 16. The housing 12 is adapted to receive and slidably support a stick of butter 18. The stick of butter 18 is placed in the housing as it is normally purchased in the grocery store with the paper wrapping 20 thereon. The housing 12 is made of a plastic or organic polymeric material, such as polyethylene, which has low friction characteristics. The paper wrapping 20 of the butter 18 is disposed in sliding relationship with the walls of the housing 12. The organic polymeric material of which the housing 12 is made is flexible so that the housing may be manually grasped or squeezed to flex and move the walls of the housing 12 inwardly to frictionally engage the stick of butter, thus preventing the stick from sliding in the housing 12.

A flange 22 is disposed about the exterior of the housing 12 in spaced relationship to the open end 14.

Figure 2:
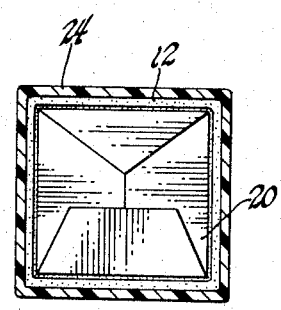
FIGURE 2 is a cross-sectional view taken substantially along line 2—2 of FIGURE 1.

A cap 24 is removably disposed about the housing 12 and in engagement with the flange 22, as best illustrated in FIGURE 1. The cap 24 has a substantially square cross section, as best illustrated in FIGURE 2. That is, the cap 24 includes four side walls which are interconnected by an end wall 26. The end wall 26 is disposed in spaced relationship to the open end 14 of the housing 12 when the cap 24 is in engagement with the flange 22, as best illustrated in FIGURE 1.

Figure 3:
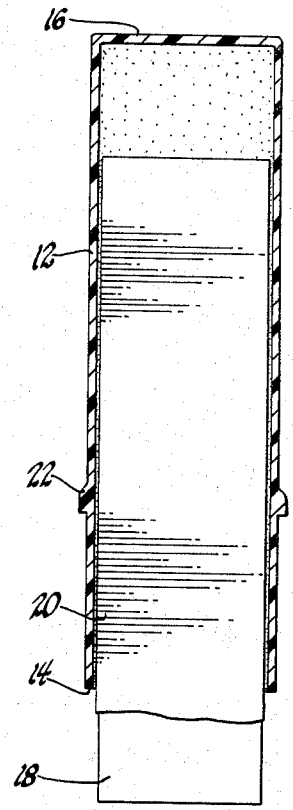
FIGURE 3 is a cross-sectional view of the instant invention with the cap removed and a predetermined length of the material exposed for dispensing.
Figure 4:
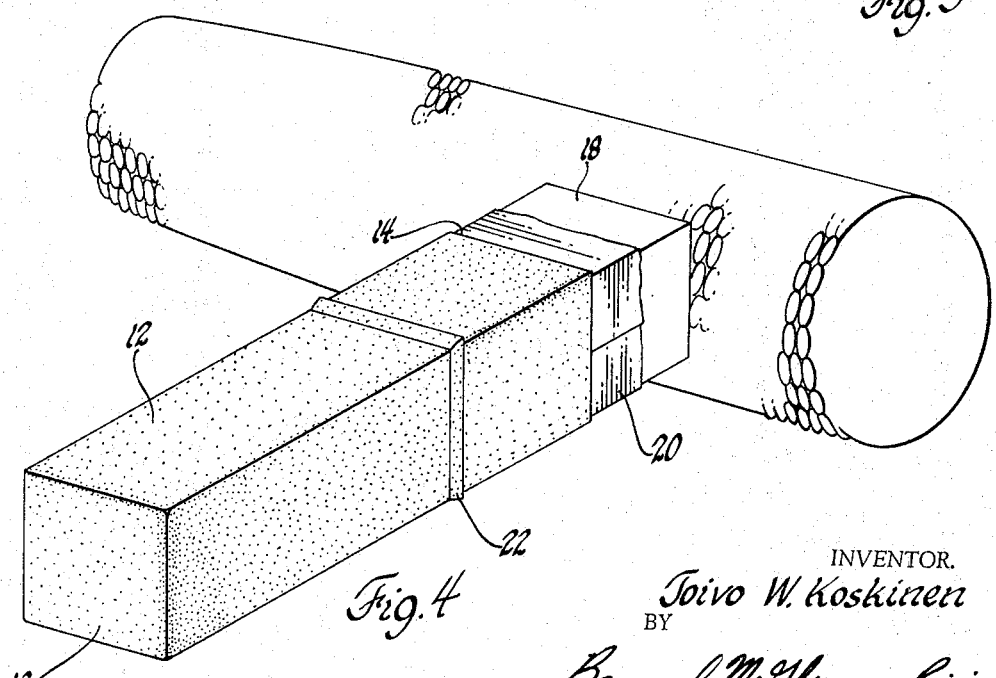
FIGURE 4 is a perspective view of the instant invention shown in position for dispensing material contained therein.

A stick of butter with the paper disposed thereabout is inserted into the housing 12 and the cap 24 is disposed on the housing 12 for storing a stick of butter. When it is desired to use the butter 18, the container is inverted, whereby the stick of butter slides out of the open end 14 and engages or abuts the end wall 26 of the cap 24 so that a predetermined length of the stick of butter extends from the housing. The side walls of the housing 12 are then grasped to flex and move inwardly to frictionally engage the stick of butter to prevent the stick of butter from sliding relative to the housing. As the stick of butter is thus retained in position, the cap 24 is removed to expose the predetermined length of the stick of butter, as illustrated in FIGURES 3 and 4. Normally, a small amount or strip of paper is removed from the stick of butter to expose the end of the stick for application to an article or foodstuff, such as the corn illustrated in FIGURE 4. When it is no longer desired to dispense the butter, the housing 12 is positioned to allow the stick of butter to slide downwardly in the housing to engage the base wall 16 and the cap 24 is replaced on the housing whereby the container stores the butter, and which container may then be placed in a refrigerator, or the like.

The edge of the open end 14 may be utilized as a cutting edge to remove a strip of the wrapper 10.

It will be understood by those of ordinary skill in the art that although the invention has been described as having a substantially square cross section that it may be of various other cross sections such as circular, hexagonal, etc. Also, the invention has been described as preferably made of an organic polymeric material but may also be made of paper, cardboard, metal or other materials.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claim, the invention may be practiced otherwise than as specifically described.

The embodiments of the invention in which an exclusive property or privilege is claimed are defined as follows:

1. A storage and dispensing container of the type suitable for storing and dispensing butter and the like, said container comprising, a housing having a substantially square cross section defined by side walls and having an open end and adapted to receive and slidably support a stick of butter wrapped in paper or the like, said housing being made of an organic polymeric material which is flexible so that the walls of said housing may be manually flexed inwardly to frictionally engage the stock for preventing movement thereof relative to said housing, an abutment disposed about the exterior of said housing in spaced relation to said open end thereof, and a cap having a substantially square cross section removably disposed about said housing and in engagement with said flange, said cap having a flat planar end wall which is disposed in spaced relation to said open end of said housing so that said container may be inverted to slide the stick of butter out of said open end to engage the end wall of said cap and the housing may be flexed to frictionally engage the stick of butter to retain the stick of butter in position as the cap is removed to expose a predetermined length of the stick of butter for dispensing by application thereof to an article of food, said side walls of said housing being flat and planar on the interior thereof so that the inner periphery of said housing is of a substantially constant shape therealong.

References Cited

UNITED STATES PATENTS

| | | | |
|---|---|---|---|
| 978,189 | 12/1910 | Moss | 206—56 |
| 1,885,654 | 11/1932 | Vercelli | 206—56 |
| 2,941,562 | 6/1960 | Ripin | 220—42 X |
| 3,133,663 | 5/1964 | Schurman et al. | 220—42 |

FOREIGN PATENTS 288,078    4/1928    Great Britain.

MARTHA L. RICE, *Primary Examiner.*